Nov. 3, 1931. R. A. KLOCK 1,829,935
STORAGE BATTERY AND CONTAINER THEREFOR
Filed Nov. 8, 1924
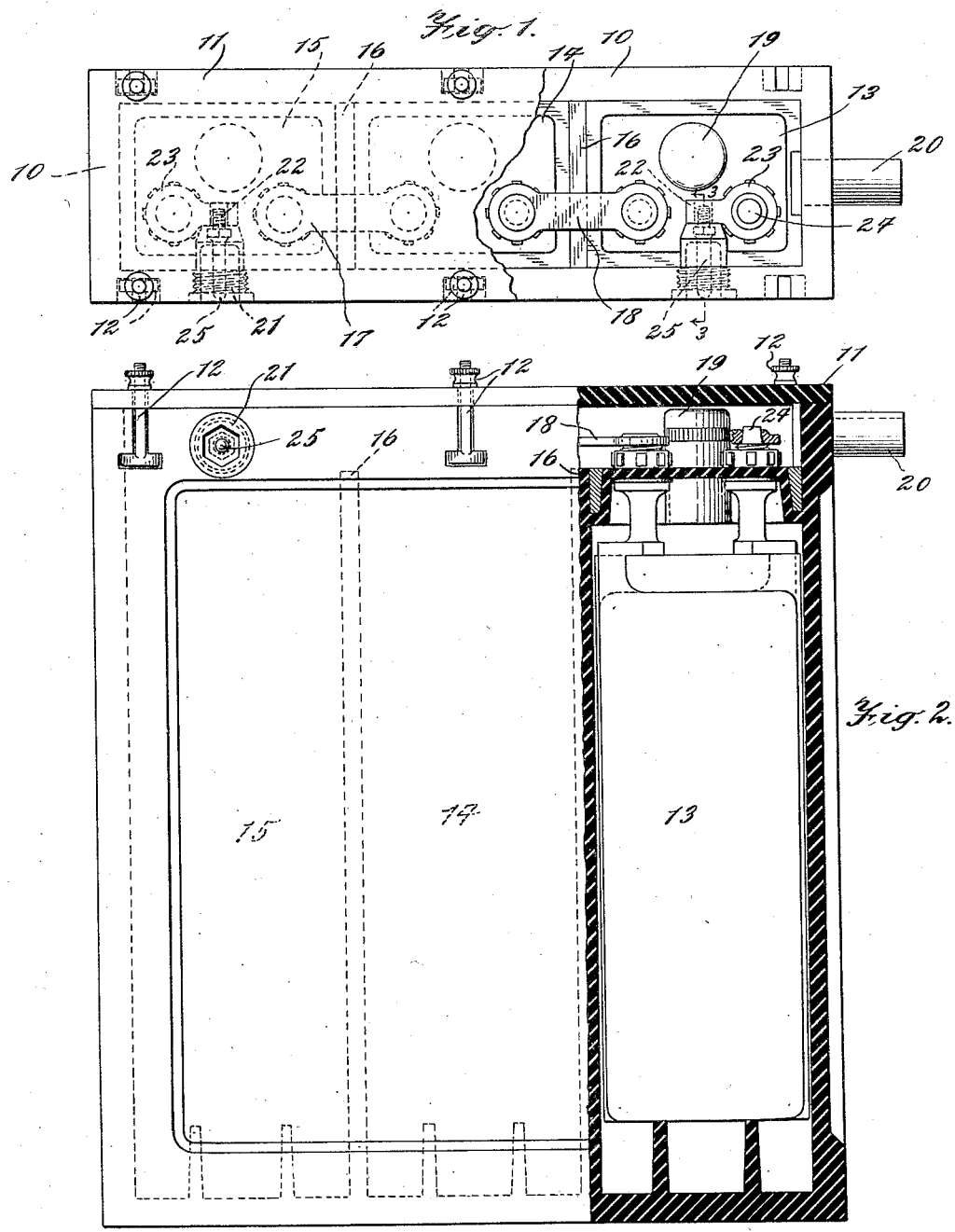
INVENTOR.
Raymond A. Klock
BY Gifford & Scull
his ATTORNEYS Patented Nov. 3, 1931

1,829,935

UNITED STATES PATENT OFFICE

RAYMOND A. KLOCK, OF CLOSTER, NEW JERSEY, ASSIGNOR, BY MESNE ASSIGNMENTS, TO GOULD STORAGE BATTERY CORPORATION, OF DEPEW, NEW YORK, A CORPORATION OF DELAWARE

STORAGE BATTERY AND CONTAINER THEREFOR

Application filed November 8, 1924. Serial No. 748,532.

As is well known, storage batteries or accumulators during periods of charging and discharging give off minute quantities of gases of a corrosive nature. When the batteries are stored in a cabinet containing metal parts, as, for example, in cabinets in which there is both radio and phonographic apparatus, these gases, though minute in amount, may be quite damaging to the metallic parts of such apparatus. It is therefore advisable in such outfits to encase the storage battery and the rectifying apparatus, if present, in a container having suitable venting means, whereby such gases will be kept away from the metallic parts in the cabinet. An arrangement of this sort is described and claimed in the application of A. H. Synder, Serial No. 726,582 filed July 17, 1924, Patent No. 1,633,137, dated June 21, 1927.

In employing such an arrangement, it is desirable that the electrical conductors from the battery terminals be brought through the container walls by simple and effective means without giving rise to leakage of gas through such walls and that means be provided for readily connecting the battery leads to and disconnecting them from the terminals of the conductors.

My invention relates to such means and is illustrated in the accompanying drawings, in which Fig. 1 is a plan view with parts broken away of a preferred embodiment; Fig. 2 is a side elevation, also showing parts broken away and removed; Fig. 3 is a view in section of my improved terminal and is taken along the line 3—3 of Fig. 1.

Referring to the drawings, 10 denotes a container of rubber or similar material having a lid 11 suitably secured by clamps 12. Filling the container is shown a storage battery of three cells 13, 14 and 15, each of which is separated by partitions 16. The cells are shown connected in series by bus bars 17 and 18. Each cell has the usual vent cap 19 and the space between the top of cells 13, 14 and 15 and the lid 11 is vented by means of a short tube 20.

In order to bring the battery terminals to the exterior of the container 10 through a gas tight joint, and, at the same time provide means for the ready attachment of the electrical conductors, I preferably provide for each battery terminal an inwardly concaving socket member 21 passing through a wall of container 10 and having threaded relationship therewith. The member 21 preferably has its inner end thickened and extending through said thickened end is a stud or prod 25 which is located axially and which is represented as having a reduced threaded end 22 projecting beyond the socket and carrying a nut 22$^a$. Intermediate its ends the stud or prod has an enlarged portion 25$^a$ embedded within the material of the thickened end of the socket. The numeral 23 designates a conductor leading to the adjacent terminal post of the storage battery and this conductor is disposed about the nut 22. Preferably socket member 21 and conductor 23 are made of lead, which is not corrodable by the gases and such parts are preferably welded or "burned" to one another and the conductor 23 burned to the battery terminal 24. The stud 25 may consist of a harder metal, such as brass. However, it will be understood that other materials may be used, as, for example, socket member 21 may consist of hard rubber or other dielectric material and stud 25. Regardless of the detail as to materials, it is apparent that the socket member is cast or molded about the stud or prod. The prod is represented as terminating within the socket so as not to strike against any adjacent objects and be broken by such contact. This stud or prod is adapted to have a suitable terminal clip, not shown, engaged thereon.

It will be seen that I have provided a gastight terminal which will not corrode and that such construction has many advantages over a wire passing through the wall of the container which latter arrangement is subjected both to gas leakage through the joint and to corrosion of the wire and other metal parts in proximity to the battery.

I claim:

1. A container having therein an electric accumulator or the like, venting means therefor, an inwardly concaving lead socket member passing through a wall of said container substantially flush with the exterior of said wall and making a gas tight fit therewith, means composed of a metal harder than lead in the concavity of said member affording an electrical connection, and a lead electric connection interior of the casing between said metallic means and a battery terminal.

2. In an assembly of the character described, a casing of insulating material, a storage battery therein and entirely enclosed thereby, and a gas tight terminal structure for the battery comprising a metallic socket member screwed through one wall of the casing, the socket member having its inner end thickened, a metal stud extending axially of the socket and having an enlargement embedded within said thickened end, said stud having one end terminating within the socket and having its other end projecting beyond said thickened end and threaded, a nut member screwed upon said threaded end, and a conductor cast about the nut and connected with the storage battery terminal.

RAYMOND A. KLOCK.